United States Patent [19]

Hughes

[11] Patent Number: 4,922,275
[45] Date of Patent: May 1, 1990

[54] AUTOMATIC PANORAMIC CAMERA MOUNT

[75] Inventor: Larry M. Hughes, Largo, Fla.

[73] Assignee: Burle Technologies, Inc., Wilmington, Del.

[21] Appl. No.: 412,212

[22] Filed: Sep. 25, 1989

[51] Int. Cl.$^5$ ............................................... G03B 17/00
[52] U.S. Cl. ..................................... 354/293; 358/108; 248/349
[58] Field of Search .................. 354/81, 293; 352/243; 358/87, 93, 108; 248/349

[56] References Cited

U.S. PATENT DOCUMENTS

| | | | |
|---|---|---|---|
| 1,945,112 | 1/1934 | Hogan | 352/243 |
| 3,164,838 | 1/1965 | Heinrich | 352/243 X |
| 3,398,664 | 8/1968 | Bonatsos | 354/81 |
| 3,437,753 | 4/1969 | Stith | 352/243 X |
| 4,058,831 | 11/1977 | Smith | 358/87 |
| 4,233,634 | 11/1980 | Adams | 352/243 X |
| 4,330,184 | 5/1982 | Fattore, Jr. et al. | 354/293 X |
| 4,499,490 | 2/1985 | Morgan | 358/87 |
| 4,655,567 | 4/1987 | Morley | 354/293 X |
| 4,673,268 | 6/1987 | Wheeler | 354/293 X |
| 4,720,805 | 1/1988 | Vye | 352/243 X |

Primary Examiner—L. T. Hix
Assistant Examiner—Brian W. Brown
Attorney, Agent, or Firm—Martin Fruitman

[57] ABSTRACT

A motor driven panoramic mounting for cameras which provides an automatic pan range and the ability to go beyond the automatic range under manual control. The automatic mode is restarted regardless of the position of the camera at the restart. Four mechanical actuators are used which move a star shaped cam that turns another cam upon which a reversing switch actuator rides. The reversing switch cam has a central flat positioned within the movement differential zone of the limit switch so that it remains in its last condition due to hysteresis, whereas the outer end flats actuate the switch to reverse the camera motion.

4 Claims, 3 Drawing Sheets

AUTOMATIC PANORAMIC CAMERA MOUNT

SUMMARY OF THE INVENTION

This invention deals generally with television cameras, and more specifically with a panoramic drive system for a surveillance camera.

Surveillance cameras have become common items in our society. They are used in department stores and in industrial locations, and they are replacing the traditional night watchman. By using closed circuit cameras, one person can guard a much larger area than once was protected by several watchmen.

Some of this ability comes from the use of automatic panoramic cameras. Such cameras routinely pan back and forth across the monitored area, showing the operator a larger area than would be available if the camera where aimed in only one direction. However, the ability of a guard to secure an area also depends upon the ability to stop the camera and study a suspicious region or to manually override the routine auto-pan range. Without such versatility, securing an area with the use of multiple cameras and viewing monitors becomes an almost impossible task. It requires the operator to be viewing the particular monitor at the time of activity or to wait until the panning motion returns the view to that same area.

Moreover, it is vital to reestablish the routine auto-pan action after the camera has been stopped without requiring the operator to manually return the camera to a more limited pan range after viewing a scene beyond the limits of that pan range.

The present invention is a panoramic drive for a camera which furnishes the versatility which is required to make a closed circuit television security monitoring system both easy to use and more efficient. This is accomplished by the use of four mechanical actuators which move a uniquely shaped star cam which then operates another cam upon which a reversing switch actuator rides. The four mechanical actuators are attached to the rotating table to which the camera is attached, and as the table rotates the mechanical actuators each turn the star shaped cam when they contact it.

The mechanical actuators, commonly referred to as limit stops, are easiest considered as two pairs of limit stops, one pair straddled by the other. The inner pair of limit stops determines the range of the automatic panning of the camera, and the outer pair limits the absolute maximum camera motion, even if being controlled manually.

The star shaped cam which the limit stops hit has five protrusions around its circumference, with four spaces or grooves separating the protrusions. The center protrusion of the five reverses the camera motion automatically as each of the two inner limit stops hit it, and the next protrusion in each direction from the center one acts as the final stop when the one of the outer pair of limit stops hits them. The outermost protrusions on the star cam are pushed by the outermost limit stops to reset the star cam when the system is placed back into automatic operation after manual control is used to extend its range.

The star cam operates in conjunction with another unique cam to accomplish its purpose of automatic reversal with manual override. The second cam is on the same shaft as the star cam and is almost circular. It has only three slightly different plateaus on it. The center plateau has a lower one on one side and a higher one on its other side. The key to the operation of the system is that a conventional electrical limit switch, with its actuator riding on the plateau of the second cam, will change its condition only when it first reaches one of the outer plateaus, but will not do so as it leaves that plateau. This hysteresis is due to the movement differential of the switch, which is the movement between the operating point where the initial contact is made, and the reset point where the return contact transfer takes place. Thus, the camera will reverse when the system causes the electrical limit switch to be activated at one end of the rotation, but the next reversal will only take place at the other end of the rotation. It is this action which gives the system the ability to operate in the manual override region and fully recover into automatic pan by first operating in reverse when it is put on automatic.

The present invention therefor permits the operator to take over control of the normally panning camera and to be confident that no loss of security will occur when he returns the system to automatic panning.

DETAILED DESCRIPTION OF THE INVENTION

Figure 1:
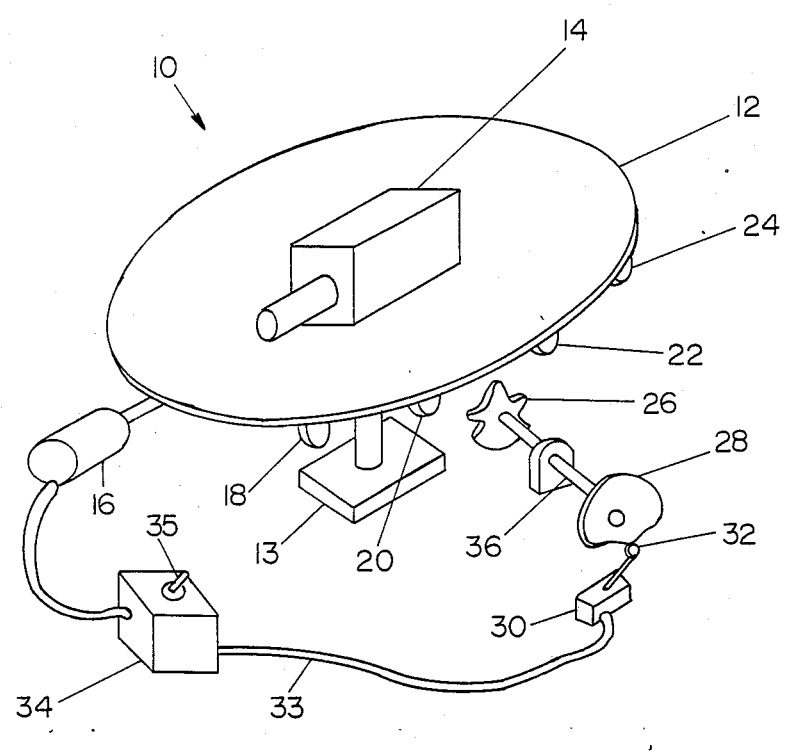
FIG. 1 is a simplified diagram of the structure of the preferred embodiment of the camera panning system of the invention.

FIG. 1 is a simplified diagram of the structure of the preferred embodiment of the invention in which panning system 10 includes table 12 on top of which is attached camera 14. Motor 16 rotates table 12 in relation to base 13 within the limits determined by the controls of panning system 10.

Limit stops 18, 20, 22, and 24 are also attached to table 12. Although their preferred location is on the underside of table 12 in order to keep them out of the way, they may be attached at any location, and may also be located off of table 12 as long as they rotate in conjunction with table 12.

Limit stops 18, 20, 22, and 24 contact star cam 26 as table 12 rotates, and star cam 26 in turn rotates cam 28 which is mounted on the same shaft as star cam 26. Electrical limit switch 30 is mounted so that its actuator 32 is in constant contact with cam 28. Cam 28 therefore changes the condition of electrical limit switch 30 depending ultimately upon the orientation of table 12 and the interaction of cams 18, 20, 22 and 24 with star cam 26. Under normal circumstances shaft 36 and cam 28 would be located underneath table 12 to save space, but in FIG. 1 they are shown extended out from under table 12 for clarity of the drawing. It should be clear that the operation of the invention is unaffected by this difference in orientation.

Motor 16 turns table 12 by conventional means, such as a worm gear (not shown) mounted on the underside of table 12. Motor 16 is itself controlled and powered by motor control 34. The direction of operation of motor 16 is controlled by limit switch 30 through motor control 34 in conventional fashion, causing motor 16 to reverse its direction of motion whenever limit switch 30 changes its condition.

As will be explained in detail in regard to FIGS. 2 and 3, innermost limit stops 20 and 22 control the operation of motor 16, and therefore the panning of camera 14, when the system is in automatic mode. Limit stops 18 and 24, the outermost limit stops, act as final limits to stop the motion of table 12 when the system is being operated in its manual mode.

Figure 2:
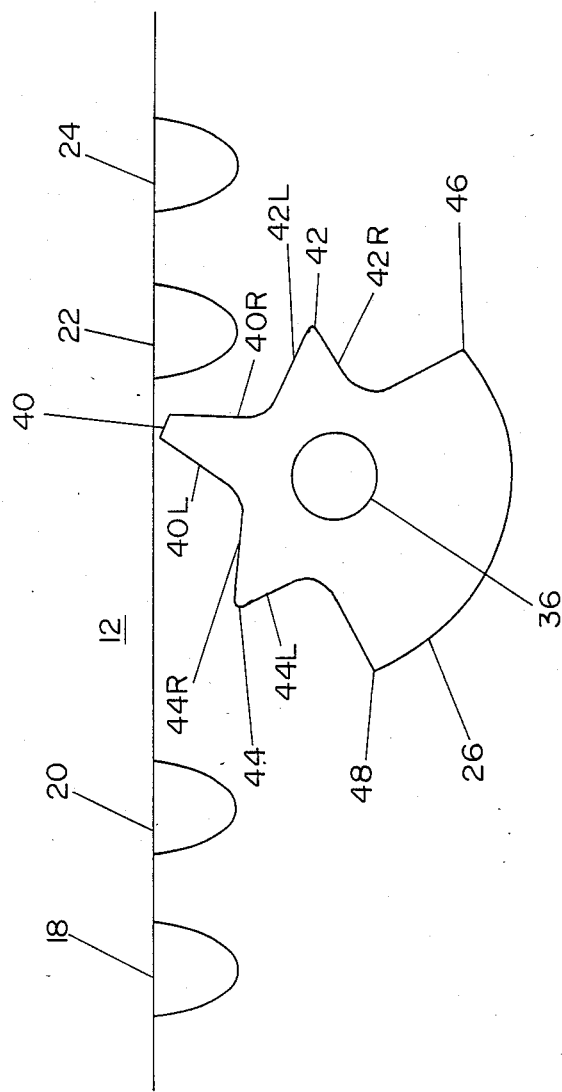
FIG. 2 is a simplified schematic diagram of the interaction of the limit stops and the star cam.
Figure 3:
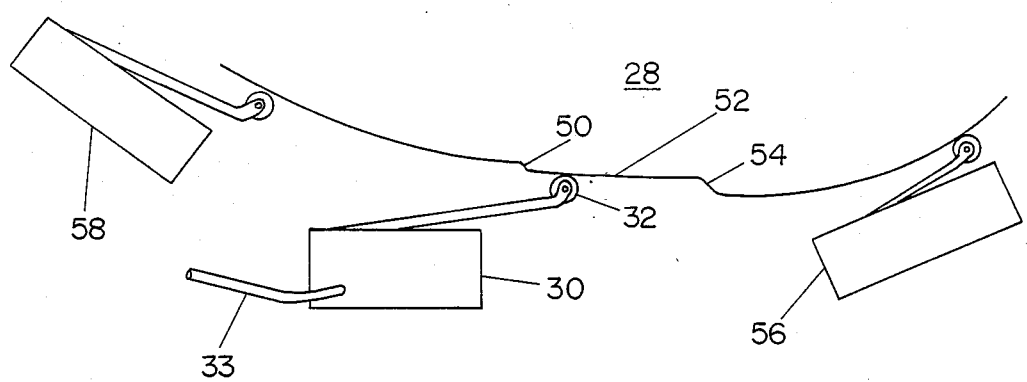
FIG. 3 is a simplified schematic diagram of the interaction of the electrical limit switches and the second cam.

FIG. 2 is a simplified diagram of the interaction of limit stops 18, 20, 22 and 24 with star cam 26, and FIG. 3 is a simplified diagram of the interaction between cam 28 and limit switches 30, 56 and 58. FIG. 2 is a straight on side view of star cam 26 with table 12 located over it so that limit stops 18, 20, 22 and 24 contact star cam 26 as table 12 moves. Although this movement is rotation in the preferred embodiment, it could also be linear, or nearly so, particularly if the lens of camera 14 were aimed essentially in the same direction as shaft 36.

As shown in FIG. 2, star cam 26 has a central protrusion, lobe 40, and two pairs of protrusions straddling it. Lobes 42 and 44 are those nearest to lobe 40, and lobes 46 and 48 are the ones most remote. Lobes 42 and 44 of the inner set are equidistant from lobe 40, and lobes 46 and 48, the outer set, are also equidistant from central lobe 40. Valleys separate each of the lobes from their adjacent ones, but outermost lobes 46 and 48 require no separating valley between them.

FIG. 3 shows cam 28 and its interaction with limit switch 30. Although cam 28 has an essentially circular circumference, in order to more clearly show its operation, FIG. 3 exaggerates cam 28 to show its active region for purposes of explanation.

Since star cam 26 and cam 28 are mounted on the same shaft and turn in unison, the operation of the invention is best understood by reference to FIGS. 2 and 3 together. When panning system 10 is set for automatic operation, electrical limit switch 30 is fully interconnected to motor control 34 by cable 33, and the system operates as described below.

As table 12 moves toward the left in FIG. 2 limit stop 22 first contacts lobe 40 on surface 40R and causes star cam 26 to rotate counterclockwise. This causes a similar counterclockwise rotation of cam 28 in FIG. 3, which is on the same shaft 36 as star cam 26. Therefore, as cam 28 moves toward the right in FIG. 3, step 50 affects actuator 32 of limit switch 30 which changes its condition and causes motor 16 to reverse its direction.

When motor 16 reverses, it causes table 12 to move to the right in FIG. 2, in the direction opposite from its previous motion. This causes limit stop 20 to move toward and contact lobe 40 on surface 40L. As limit stop 20 pushes against lobe 40, star cam 26 and cam 28 both move in a clockwise direction. This causes actuator 32 of limit switch 30 to move back across step 50, across plateau 52 and onto step 54. The characteristics of limit switch 30, are, however, such that its hysteresis does not permit it to change condition as it moves back over step 50 and across plateau 52. Limit switch 30 only changes its condition when it moves across step 54 causing its motion to surpass the limit of its hysteresis characteristic. Therefore, the reversing action of limit switch 30 takes place, not as cam 28 first moves step 50 past switch actuator 32, but only when step 54 affects switch actuator 32. This motion of cam 28 is designed to correspond exactly with the motion of star cam 26 as limit stop 20 pushes against surface 40L. The reverse motion of table 12 acts in the same manner with limit switch 30 changing condition, not as actuator 32 moves back across step 54, but only when it is again affected by step 50.

The automatic panning motion of table 12 and camera 14 is therefore controlled by the location of limit stops 20 and 22. However, panning system 10 also has the capability of operating beyond the range of automatic panning. This is accomplished by merely disconnecting electrical limit switch 30 from motor control 34 with its internal switch 35 and using conventional manual motor controls (not shown).

In the manual mode of operation limit stops 18 and 24 become effective in conventional motor control circuitry (not shown) by each one moving star cam 26 so that a final limit switch cuts off power for continued motion in that direction. As table 12 moves left so that limit stop 22 pushes past lobe 40, limit stop 24 pushes against surface 42R of lobe 42. This causes continued rotation of star cam 26 and therefore also rotates cam 28 so that step 54 activates limit switch 56 which stops power to motor 16 to discontinue moving table 12 to the left. Manual control of motor 16 to cause table 12 to move to the right can still be operated, however, until limit stop 18 hits surface 44L of lobe 44 to rotate cam 28 until step 50 affects limit switch 58 cutting off power for that direction of motion. An important aspect of the present invention is that, regardless of such manual operation, the system will return to automatic panning within the prescribed range when automatic mode is restarted.

This occurs because of the shape of star cam 26 and the hysteresis characteristic of limit switch 30. If, for instance, limit stop 24 has pushed lobe 42 to the location at which step 54 has affected limit switch 56, then activator wheel 32 of limit switch 30 is also located to the left of step 50 which has already put limit switch 30 in condition to reverse motor 16 although limit switch 30 is actually disconnected from the circuit. If the system is put back into automatic panning from this setting, limit switch 30 will cause motor 16 to move so that table 12 moves to the right and star cam 26 and cam 28 both move clockwise. This occurs because limit stop 24 first pushes against lobe 46, therefore rotating star cam 26 so that limit stop 22 pushes against lobe 42 on surface 44L. This motion once more places lobe 40 between limit stops 20 and 22 which is their normal location for automatic operation.

At the opposite end of the manual range, the action which takes place upon reestablishment of automatic operation is the same, except that limit stop 18 pushes against lobe 48 and limit stop 20 moves lobe 44. At both ends of the manual range, or at any position in between, whenever automatic operation is reactivated by reconnecting limit switch 30 to the circuit, the automatic panning action is reestablished and is limited to the previously set range.

It is this operation that assures that an operator returning the system to automatic panning will not inadvertently establish panning over a different range.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For instance, mechanical stops could be used instead of limit switches 56 and 58 or separate cams could be used to operate those switches. Moreover, star cam 26 and cam 28 could be coupled by means other than being on the same shaft.

What is claimed as new and for which Letters Patent of the United States are desired to be secured is:

1. A camera panning control apparatus comprising:
   a moveable table to which a camera can be attached;
   first, second, third and fourth limit stops mechanically coupled to the movement of the table;
   a rotatable star cam located so that its outer cam surface is contacted by each of the limit stops in sequence as the table moves through its entire range of permitted motion, the star cam being shaped to have five lobes on its outer cam surface, the first lobe being centered among the others, the second and third lobes being located on opposite sides of the first lobe and being equidistant from the first lobe, and the fourth and fifth lobes being located on opposite sides of the first lobe, more remote from the first lobe than the second and third lobes, and also being equidistant from the first lobe, with the first lobe located and oriented so that the second and third limit stops contact its opposite surface as the table moves;
   a second cam mechanically interconnected with the star cam and having a cam surface which comprises a central plateau with a higher plateau at one end of the central plateau and a lower plateau at the other end of the central plateau;
   an electrical motor mechanically coupled to and moving the table;
   a motor control means connected to the motor and controlling the direction of movement of the motor and the table; and
   an electrical limit switch connected to the motor control means and including an actuator which is located so that it is in contact with the cam surface of the second cam, the characteristic of the electrical limit switch being such that it will change its condition when it moves from the central plateau to either the higher plateau or the lower plateau, but will not change its condition as it moves from the lower plateau or the higher plateau to the central plateau, the electrical limit switch operating to reverse the motion of the motor when its condition changes.

2. The camera panning apparatus of claim 1 further including a disconnect switch to disconnect the electrical limit switch from the motor control.

3. The camera panning apparatus of claim 1 further including two additional limit switches located so that one operates when a limit stop turns the star cam by contacting the third lobe and the other operates when a limit stop turns the star cam by contacting the second lobe.

4. The camera panning apparatus of claim 1 further including manual controls for moving the motor in both forward and reverse directions.

* * * * *